United States Patent
Xu et al.

(10) Patent No.: US 12,097,842 B2
(45) Date of Patent: Sep. 24, 2024

(54) CLUTCH ARRANGEMENT FOR A HYBRID VEHICLE POWERTRAIN

(71) Applicant: DELPHI TECHNOLOGIES IP LIMITED, St. Michael (BB)

(72) Inventors: Xiangdong Xu, Shanghai (CN); Andy Bian, Shanghai (CN)

(73) Assignee: Delphi Technologies IP Limited, St. Michael (BB)

( * ) Notice: Subject to any disclaimer, the term of this patent is extended or adjusted under 35 U.S.C. 154(b) by 5 days.

(21) Appl. No.: 17/766,626

(22) PCT Filed: Nov. 18, 2020

(86) PCT No.: PCT/EP2020/082591
§ 371 (c)(1),
(2) Date: Apr. 5, 2022

(87) PCT Pub. No.: WO2021/099422
PCT Pub. Date: May 27, 2021

(65) Prior Publication Data
US 2024/0051517 A1    Feb. 15, 2024

(30) Foreign Application Priority Data
Nov. 18, 2019   (GB) ..................... 1916751

(51) Int. Cl.
*F16D 23/00*      (2006.01)
*B60K 6/383*      (2007.10)
(Continued)

(52) U.S. Cl.
CPC ............ *B60W 20/40* (2013.01); *B60K 6/383* (2013.01); *B60K 6/40* (2013.01); *B60W 10/02* (2013.01);
(Continued)

(58) Field of Classification Search
None
See application file for complete search history.

(56) References Cited

U.S. PATENT DOCUMENTS

2017/0108052 A1\*  4/2017  Littlefield .............. F16D 11/14
2018/0312050 A1\*  11/2018  Endo ..................... F16H 3/725
(Continued)

FOREIGN PATENT DOCUMENTS

| | | |
|---|---|---|
| CN | 107757337 B | 3/2018 |
| JP | 2016175575 A | 10/2016 |
| JP | 2017193320 A | 10/2017 |

OTHER PUBLICATIONS

International Search Report issued on Mar. 5, 2021 in counterpart International Patent Application No. PCT/EP2020/082591 (9 pages, in English).

*Primary Examiner* — James M McPherson
(74) *Attorney, Agent, or Firm* — Joshua M. Haines; Bookoff McAndrews, PLLC

(57) ABSTRACT

A clutch arrangement for a hybrid vehicle powertrain including an input shaft to be connected to a crankshaft of an internal combustion engine, an output shaft for connection to a transmission, a one-way clutch comprising an inner race connected to rotate with the input shaft and an outer race, a coupling hub rotationally coupled with the output shaft, a synchronizer ring arranged between the coupling hub and the one-way clutch, the synchronizer ring cooperating with the outer race of the one-way clutch, and a coupling sleeve unit that is selectively and axially moveable across the coupling hub. The synchronizer ring and the outer race include three positions, a neutral position, a first position, and a second position.

15 Claims, 4 Drawing Sheets

(51) Int. Cl.

| | |
|---|---|
| *B60K 6/40* | (2007.10) |
| *B60W 10/02* | (2006.01) |
| *B60W 10/06* | (2006.01) |
| *B60W 10/08* | (2006.01) |
| *B60W 20/40* | (2016.01) |
| *F16D 23/02* | (2006.01) |
| *F16D 28/00* | (2006.01) |
| *F16D 41/069* | (2006.01) |
| *F16D 48/06* | (2006.01) |

(52) U.S. Cl.
CPC ............ *B60W 10/06* (2013.01); *B60W 10/08* (2013.01); *F16D 23/025* (2013.01); *F16D 28/00* (2013.01); *F16D 41/069* (2013.01); *F16D 48/064* (2013.01); *B60Y 2200/92* (2013.01); *B60Y 2400/427* (2013.01); *F16D 2500/10412* (2013.01); *F16D 2500/10493* (2013.01); *F16D 2500/1064* (2013.01); *F16D 2500/1066* (2013.01); *F16D 2500/30415* (2013.01); *F16D 2500/30426* (2013.01)

(56) References Cited

U.S. PATENT DOCUMENTS

| | | |
|---|---|---|
| 2019/0168731 A1 | 6/2019 | Lee et al. |
| 2019/0293151 A1* | 9/2019 | Hayashi ................. F16D 23/04 |
| 2019/0301576 A1* | 10/2019 | Harada ............... F16H 37/0813 |
| 2021/0070196 A1* | 3/2021 | Vincent ............... G06F 3/04883 |
| 2021/0114455 A1* | 4/2021 | Park ........................ F16H 3/093 |
| 2021/0116021 A1* | 4/2021 | Kim ...................... F16H 61/686 |

* cited by examiner

CLUTCH ARRANGEMENT FOR A HYBRID VEHICLE POWERTRAIN

CROSS-REFERENCE TO RELATED APPLICATION(S)

This patent application is a National Stage of and claims the benefit of priority to International Patent Application No. PCT/EP2020/082591, filed on Nov. 18, 2020, which claims the benefit of priority to GB Patent Application No. 1916751.9, filed on Nov. 18, 2019, the entirety of which is incorporated herein by reference.

FIELD OF THE INVENTION

The present invention generally relates to the field of automotive vehicles. It more particularly relates to hybrid vehicles and in particular to a clutch arrangement and a powertrain for hybrid vehicle.

BACKGROUND OF THE INVENTION

Hybrid and full electric vehicles are more and more popular due to the ever more stringent regulations on $CO_2$ emissions and due to the population's awareness of environmental issues.

In this context, the P1/P3 dual motor hybrid architecture has gained interest. A conventional P1/P3 architecture includes an internal combustion engine and two rotary electric machines. A first electric machine is directly connected to the engine crankshaft. A clutch is provided to decouple the engine from the transmission. The clutch has an input shaft connected to the engine crankshaft and an output shaft to transmit torque to the drive wheels via the transmission. The second electric machine is coupled to the clutch output shaft.

Such hybrid configuration allows driving the vehicle via the second electric machine at low and moderate to high speeds. The clutch can be engaged at higher speeds to use the engine torque for driving the wheels. When the clutch is disengaged, the engine mechanical power can be used to drive the first electric machine and generate power.

An important component of this architecture is the clutch, which is conventionally either hydraulic or motor driven. A hydraulic driven clutch requires a hydraulic pump to provide a pressure source and a control solenoid to actuate the clutch. Such hydraulic pump entails energy losses. A shortcoming of the motor driven clutch is its size, because the clutch plate, fork and bearings lead to an increased axial extent. This is problematic to meet vehicle packaging demand in the case of P1/P3 dual motor transmission.

OBJECT OF THE INVENTION

The object of the present invention is to provide an improved clutch design for use in a hybrid vehicle powertrain.

SUMMARY OF THE INVENTION

According to a first aspect, the present invention concerns a clutch arrangement for a hybrid vehicle powertrain comprising:
an input shaft to be connected to a crankshaft of an internal combustion engine;
an output shaft for connection to a transmission;
a one-way clutch comprising an inner race connected to rotate with the input shaft and an outer race;
a coupling hub rotationally coupled with the output shaft;
a synchronizer ring arranged between the coupling hub and the one-way clutch, the synchronizer ring being operatively associated with the outer race of the one-way clutch; and
a coupling sleeve unit that is selectively and axially moveable across the coupling hub, synchronizer ring and outer race between three positions: a neutral position, a first position where said coupling sleeve unit couples in rotation the coupling hub, the synchronizer ring and the outer race; and a second position where the coupling sleeve unit couples in rotation the coupling hub, the synchronizer ring, the outer race and the inner race.

A merit of the present invention is to have devised a mechanically simple clutch arrangement applicable to hybrid vehicle architectures. The clutch arrangement has three positions. In the neutral position the clutch is completely disengaged and there is no coupling between input and output shafts. The first position permits a one-way drive, where the one-way clutch operates in a conventional way, allowing torque to be transferred from the inner to the outer race, but not inversely. In the second position, the inner and outer races of the one-way clutch are united, and the one-way clutch is so to speak "by-passed". This is a two-way drive position, where power can flow in both directions.

The use of a one-way clutch with synchronizer, allows simple, low cost power connection and disconnection inside a dual motor hybrid transmission, in particular of P1/P3 configuration.

The present invention has numerous benefits, amongst which:
it fully utilizes the benefit of having two motors in the hybrid transmission, which is achieved with a simple design mechanism;
it is compact in axial length compared to a DCT type motor driven clutch;
it is more energy efficient compared to a hydraulic driven clutch;
It allows competitive sourcing on low cost clutches and low cost gearboxes.

The one way clutch may be a freewheel one way clutch of conventional design. As it is known in the art, such one way clutch is typically configured to automatically couple two rotatable parts together for joint rotation when a first part rotates in a first direction, but which automatically uncouples the parts when the when the first part rotates in a direction opposite to the first direction, or uncouples the parts when the second part rotates faster than the first part. Conveniently, the one way clutch may be a sprag clutch, sprag members being arranged between the inner and outer races.

In embodiments, the coupling hub, synchronizer ring and outer race have outer faces with essentially the same diameter; the inner race has a radially offset coupling ring with an outer face having same outer diameter as said outer race; and the outer faces have spline features and said coupling sleeve unit has cooperating inner spline features. The spline features generally extend parallel to the axis of the clutch (axis of input shaft). They thus allow axial movement of the sleeve member across the other elements, but will provide coupling when the parts rotate around the axis.

In embodiments, the output shaft is cylindrical and coaxially arranged with the input shaft to rotate around it.

The coupling sleeve unit may be a single sleeve member having an axial dimension sufficient to extend over the coupling hub, synchronizer ring, outer race and the inner race. Alternatively, the coupling sleeve unit may comprises a pair of sleeve members, one of the sleeve members adapted to operate the coupling corresponding to the first position and the other sleeve members adapted to operate the coupling corresponding to the second position.

Shifting of the clutch is advantageously operated by actuating means, preferably driven by electric motor(s), configured to allow selectively moving the coupling sleeve unit axially into said positions. Therefore, the coupling sleeve member(s) have a coupling means on their outer diameter, e.g. a groove or the like, that is able to cooperate with a coupling feature of the actuating means.

In embodiments, facing extremities of the spline features on the coupling sleeve unit and said coupling ring are designed to allow backward movement of the coupling ring, in particular the extremities may be rounded or slanted.

According to another aspect, the present invention concerns a hybrid powertrain system comprising:
- an internal combustion engine having a crankshaft a first clutch arrangement according to the first aspect, disposed between the engine and a transmission, wherein the input shaft of the first clutch arrangement is integral in rotation with the crankshaft and the output shaft of the first clutch arrangement is operatively connected with the transmission;
- a first rotary electric machine permanently coupled to the crankshaft;
- a second rotary electric machine coupled to said transmission via a second clutch arrangement.

This powertrain has a P1/P3 architecture. Such powertrain is typically designed to mainly operate, i.e. at low and moderate to high speeds, with the second rotary electric machine. When the first clutch is open, the engine can be operate to produce electrical power by rotating the first electric machine operating as generator. At high speeds, the wheels can be driven by the power of the engine, by fully engaging the first clutch arrangement (position 2).

In embodiments, the first rotary electric machine is directly coupled with the crankshaft, in particular a rotor of the first rotary electric machine is fixed to a flywheel of the crankshaft. Alternatively, the first rotary electric machine may be installed within the transmission casing and driveably coupled to the input shaft, e.g. by gears or belts etc.

In embodiments, the second clutch arrangement comprises: a one-way clutch including an inner race rotating with a rotor of the second electric machine and an outer race interfacing with the transmission; and a coupling sleeve moveable between a first position and a second position, wherein in the second position the coupling sleeve couples in rotation the outer and inner races. The inner race may comprise a radially offset coupling ring having essentially same outer diameter as said outer race; the outer race and coupling ring may have spline features on their outer face; and the coupling sleeve may have an inner passage having a diameter substantially matching that of the outer race and the radial extension coupling ring, and provided with spline features.

In embodiments, the inner race is rotationally integral with a rotor of the second electric machine, in particular is fixed to said rotor. Alternatively, the inner race is mounted on a shaft directly coupled to a motor shaft of the second electric machine.

The powertrain advantageously comprises a central processing unit configured to operate a shifting process of the first clutch arrangement according to the following steps:
a) the clutch being in the initial position with the engine running, checking that the input shaft is rotating at lower speed than the output shaft, and then commanding the actuating means to move the synchronizer sleeve to the first position, thereby also moving the synchronizer ring and bringing the outer race speed up to match with the speed of the output shaft;
b) commanding the engine or the second electric machine to catch up the speed of the output shaft, whereby the inner race 52 will reach the speed of the outer race; and
c) commanding the shift actuator to further move the coupling sleeve unit into the second position, and while doing so slightly reducing the speed of the input shaft so that there is a backward move of the inner race relative to the outer race, whereby splines of synchronizer sleeve will engage with the splines of the inner race coupling ring.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
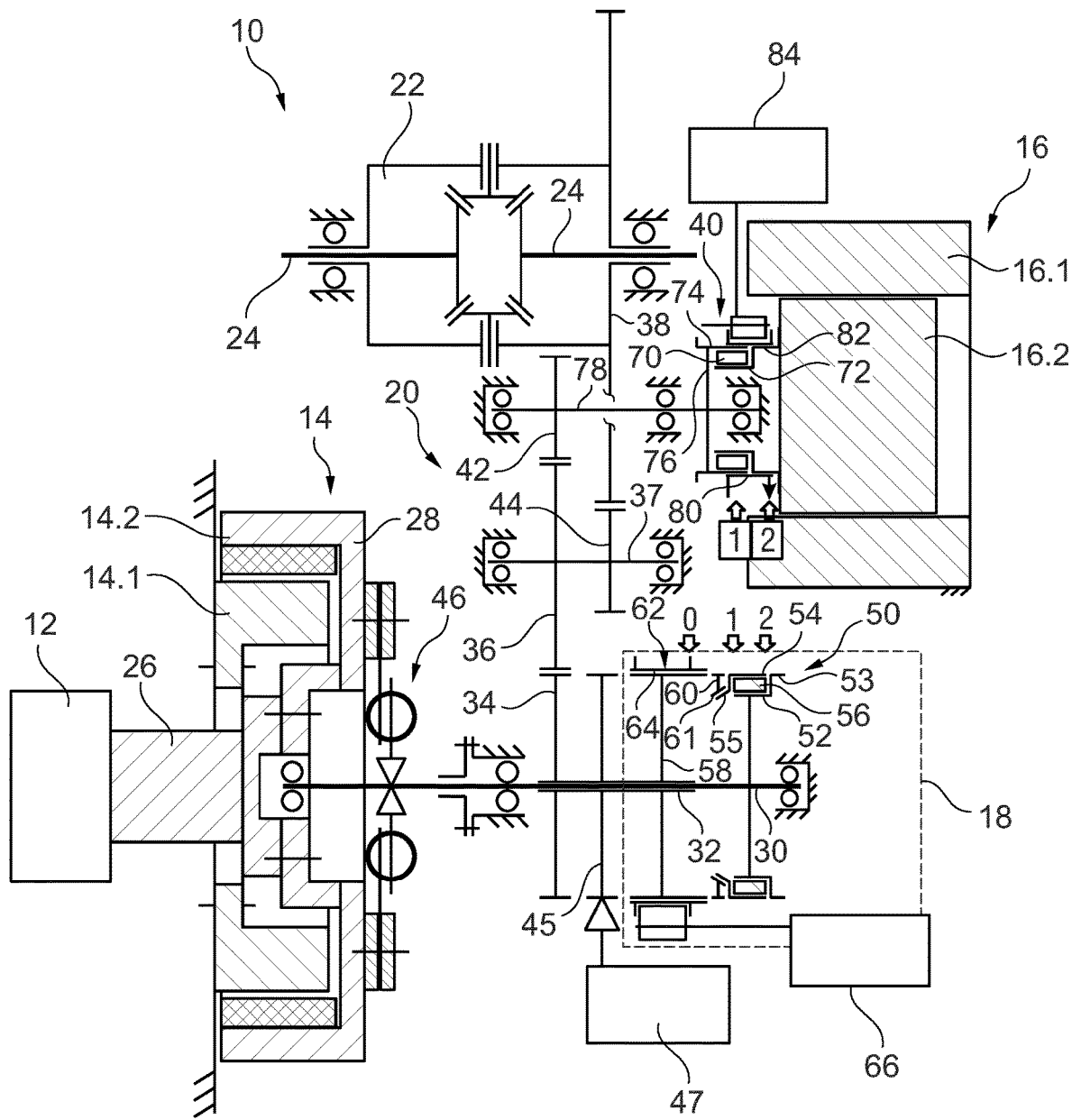
FIG. 1: is a diagram of an embodiment of a hybrid powertrain comprising a first embodiment of the present clutch arrangement.

A first embodiment of a hybrid power transmission system, or simply powertrain system 10, will be described with reference to FIGS. 1 to 5. As will be recognized by those skilled in the art, this is a P1/P3 dual motor hybrid configuration. Accordingly, the system 10 comprises an internal combustion engine 12, a first rotary electric machine 14 and a second rotary electric machine 16, which may be referred to as EM. Both EM 14 and 16 comprise a stator 14.1, 16.1 and a rotor 14.2, 16.2, and may operate as motor or generator. The powertrain 10 further comprises a first clutch arrangement 18 and a transmission 20 with a number of gears that are connected to a differential 22 having a pair of drive-shafts 24 (half-shafts) for connection to wheels (not shown).

The first EM 14 is arranged on the engine 12 side, to rotate with the engine crankshaft 26. Here the first EM 14 is actually mounted with its rotor 14.2 fixed to the flywheel 28 attached to the crankshaft 26, i.e. EM 14 is directly coupled with the engine crankshaft 26.

The first clutch arrangement 18 is arranged at the interface between the engine 12 and the transmission 20. The clutch arrangement 18 includes an input shaft 30 that is connected to rotate with the engine crankshaft 26 and an output shaft 32 that is connected to the transmission and hence ultimately coupled to the wheels. That is, a first gear 34 is disposed on the clutch output shaft 32 and is coupled, via intermediate gears to differential 22. The first gear 34 meshes with a second gear 36 (disposed on a countershaft 37) that is coupled with a third gear 38 coupled with the differential 22.

The second EM 16 is arranged on the output side of the clutch arrangement 18, and hence coupled with transmission 20, in order to be operable to deliver a driving torque to the wheels. The rotor 16.2 of the second EM 16 is coupled through a second clutch arrangement 40 to a fourth gear 42 that meshes with the second gear 36. The third gear meshes 38 with an auxiliary gear 44 disposed on the countershaft 37.

Due to this configuration of the transmission, the clutch output shaft 32 is permanently coupled with the wheels. Hence, whenever the wheels turn, output shaft 32 rotates.

A park hub 45 is disposed on the output shaft 32 and has an associated park lock actuator 47.

Turning back to the clutch arrangement 18, the input shaft 30 defines the central axis of the clutch and is rotatable thereabout. Input shaft 30 is connected to be integral in rotation with the crankshaft 26. This may be done, at the engine side of input shaft 30, through a splined connection at a shaft end of a damper unit 46 mounted to the flywheel 28.

The input shaft 30 and output shaft 32 are coaxially arranged, the output shaft 32 being, e.g., a cylindrical shaft rotatably mounted with respect to the input shaft 30.

Reference sign 50 designates a one-way clutch for selectively coupling the input shaft 30 with the output shaft 32. The one way clutch may be of conventional design. As will be known to those skilled in the art, a sprag clutch is a freewheel one way clutch that is similar to a roller bearing, but instead of cylindrical rollers, non-revolving asymmetric sprags (e.g. cam shaped steel wedges) are used between the inner and outer races. Sprag clutch 50 comprises an inner race 52 with hub that is disposed on the input shaft 30 to rotate therewith (e.g. via splined connection), an output race 54 radially spaced from the inner race, and sprag elements 56 (the sprags with the retainer member/cage) in-between. The sprag retainer is there to keep sprags in position evenly located around the gap between the two races, while allowing the sprags to tilt in both directions. The sprag shape is specially designed that when they tilt, their radial direction height changes. As a result, free rotation of the races is allowed in one direction, but not in the opposite direction, where torque is transmitted between the two races.

In the present case, when the clutch 50 rotates in one direction the sprags in between inner race 52 and outer race 54 tilt in a way that their radial direction height increase, therefore the sprags are firmly squeezed by inner 52 and outer race 54, and torque is being transferred between the two races. When clutch 50 rotates in the opposite direction the sprags tilt in a way that the their radial direction height reduces, therefore there is no pressure between sprags and the two races 52. 54, thus no torque is transferred.

Clutch arrangement 18 further includes a coupling hub 58, synchronizer ring 60 and coupling sleeve unit 62. As will be explained in more detail below, the synchronizer ring 60 is associated with the outer race 54 of the sprag clutch 50 and the clutch arrangement 18 is generally configured in such a way that the coupling sleeve unit 62 permits coupling between the coupling hub 58 and the sprag clutch 50.

The coupling hub 58 is rotationally coupled with the output shaft 32, e.g. by a splined connection on the output shaft 32. The outer diameter of the coupling hub 58 forms an outer face that is provided with spline features.

The synchronizer ring 60 has an inwardly extending conical section 61 that cooperates with a corresponding conical section 55 laterally connected to outer race 54. The outer diameter of the synchronizer ring 60 forms an outer face that is provided with spline features. Conventionally, the synchroniser ring 60 may be supported by plastic studs (not shown) axially extending from the synchronizer hub 58, being able to slide on these studs. Hence, before the shifting operation, the synchronizer ring 60 is 'floating' on the outer race cone surface, separated by oil film.

The peripheral, outer face of outer race 54 is also provided with spline features. The inner race 52 comprises a coupling ring 53 that is outwardly offset in radial direction and comprises an outer face with spline features. This coupling ring is fixed to inner race body via a radial flange.

The coupling sleeve unit 62 is configured be selectively axially moveable across the coupling hub 58, synchronizer ring 60 and sprag clutch 50, in order to come into three predetermined positions. The coupling sleeve unit 62 here comprises a single sleeve member 64 that has an axial dimension sufficient to overlap with the coupling hub 58, synchronizer ring 60 and sprag clutch 50, up to the coupling ring 53 of the inner race 52.

Sleeve member 64 is a cylindrical part provided is with spline features parallel to the clutch axis on its inner surface. The inner diameter of sleeve member 64 is adapted to match the outer diameter of the splined outer surface of the coupling hub 58. The outer diameters of the outer splined surfaces of the synchronizer ring 60, the outer race 54 and inner race extension 53 are substantially similar to the outer diameter of coupling hub 58. All spline features of these components extend parallel to the clutch axis, i.e. to the axis of input shaft 30 to allow for axial displacement of the sleeve member, but provide engagement in rotation around the clutch axis.

Reference sign 66 designates a first actuator connected to the sleeve member 64 to move the latter in axial direction between the three positions. The first actuator 66 may comprise an electric motor with an axially displaceable actuating rod with a coupling element that cooperates with a coupling feature on the outer surface of the sleeve member 64 to allow axially moving the sleeve member 64. For example, the coupling element may be a shift fork that engages in an outer annular groove of sleeve member 64.

A powertrain control unit (PCU) is typically provided to control the powertrain to deliver the required amount of torque according to the driver's request (in particular based on the position of accelerator pedal). The PCU is programmed to control all of the components of the powertrain, in particular the engine 12 and two EM 14, 16, as well as the two clutch arrangements 18, 40. The PCU receives information for a number of sensors in the powertrain.

Figure 2:
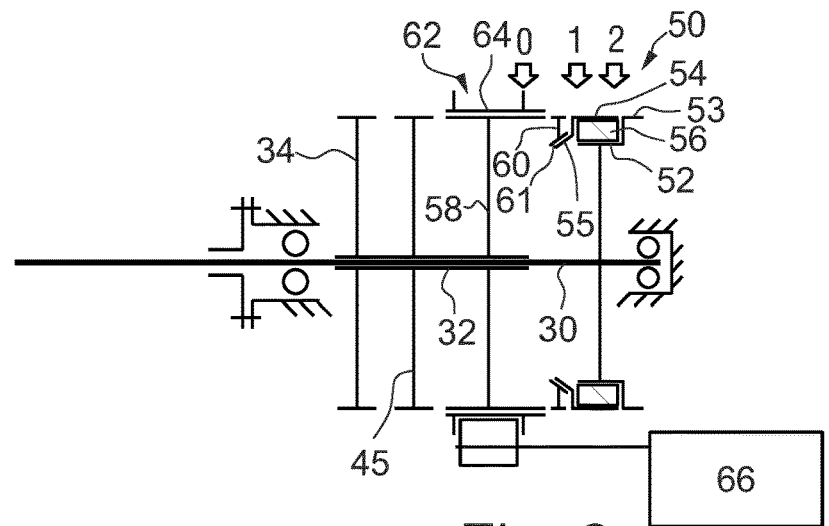
FIGS. 2 to 4: are diagrams representing the clutch arrangement of FIG. 1 in three different operating configurations.
Figure 3:
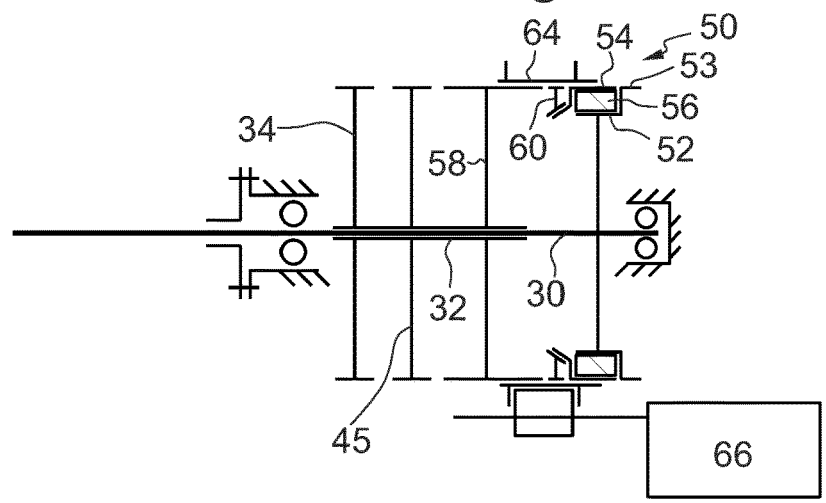
Figure 4:
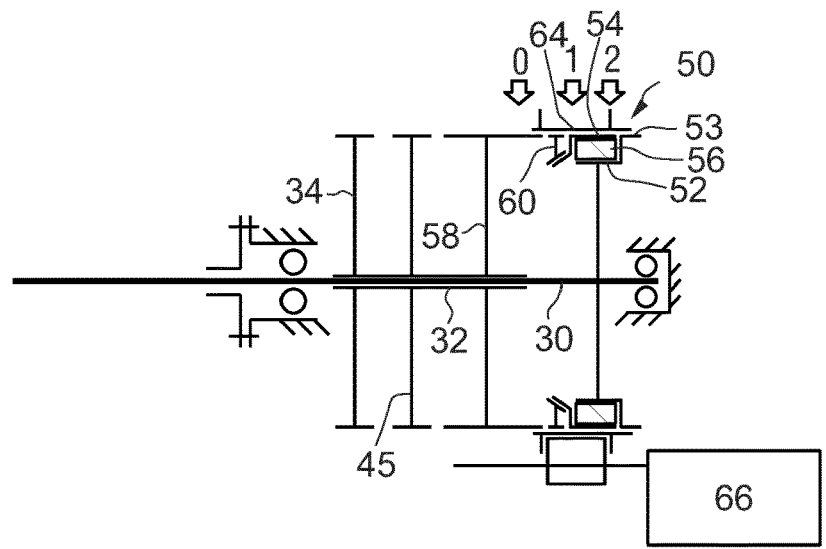

The three positions of the sleeve member are indicated 0, 1 and 2 in FIG. 1. The corresponding configurations are shown in FIGS. 2 to 4, namely:
  FIG. 2—position 0: this is the neutral position of clutch arrangement 18.
  FIG. 3—position 1: this is the one way drive position;
  FIG. 4—position 2: this is the two way drive position.

In the neutral position, FIG. 2, the sleeve member 64 is positioned over the coupling hub 58 and rotates therewith due to the splined engagement between the two parts. Input shaft 30 and output shaft 32 are uncoupled. Output shaft 32 is rotated by the first gear 34 when the wheels are turning. There is no power flow from input shaft 30 to output shaft, or inversely. The clutch arrangement 18 is thus disengaged (open).

In the neutral position, the engine 12 can be operated, when desirable, to generate electrical power via the first EM 14 without interaction with the downstream transmission.

From the neutral position, the sleeve member 64 can be moved axially towards the sprag clutch (i.e. to the right in the FIGS.) by the first actuator 66 (under control of the PCU) in order to bring the clutch in partial or full engagement.

In the configuration of FIG. 3 the sleeve member 64 has been axially displaced towards the sprag clutch 50 to overlap and hence engage with the outer face spline features of synchronizer ring 60 and of the outer race 54. In this "One-way Drive" position power can flow from the input shaft 30 to output shaft 32, but not from the output shaft 32 to input shaft 30.

Closing the clutch is achieved by further axial movement of the sleeve member 64 so that it also engages the coupling ring 53 of the inner race 52. This is position 2 "two-way drive", illustrated in FIG. 4. The sleeve member 64 thus engages with the coupling hub 58, synchronizer ring 60, sprag clutch outer race 54, and the sprag clutch inner race extension 53. Sleeve member 64, coupling hub 58, synchronizer ring 60 and sprag clutch races 52 and 54 rotate as a single unit. The clutch 50 is so to speak bypassed. The input shaft 30 and output shaft 32 are integral in rotation. Power can flow from input shaft 30 to output shaft 32 as well as from output shaft 32 to input shaft 30.

It may be noted that position 1 is in fact only an intermediate position that helps increasing the rotation speed of the outer race 54. Indeed, moving the synchronizing ring 60 against the cone section 55 of outer race 54 (i.e. to the right in the FIGS.) will progressively speed up the outer race 54.

Figure 5:
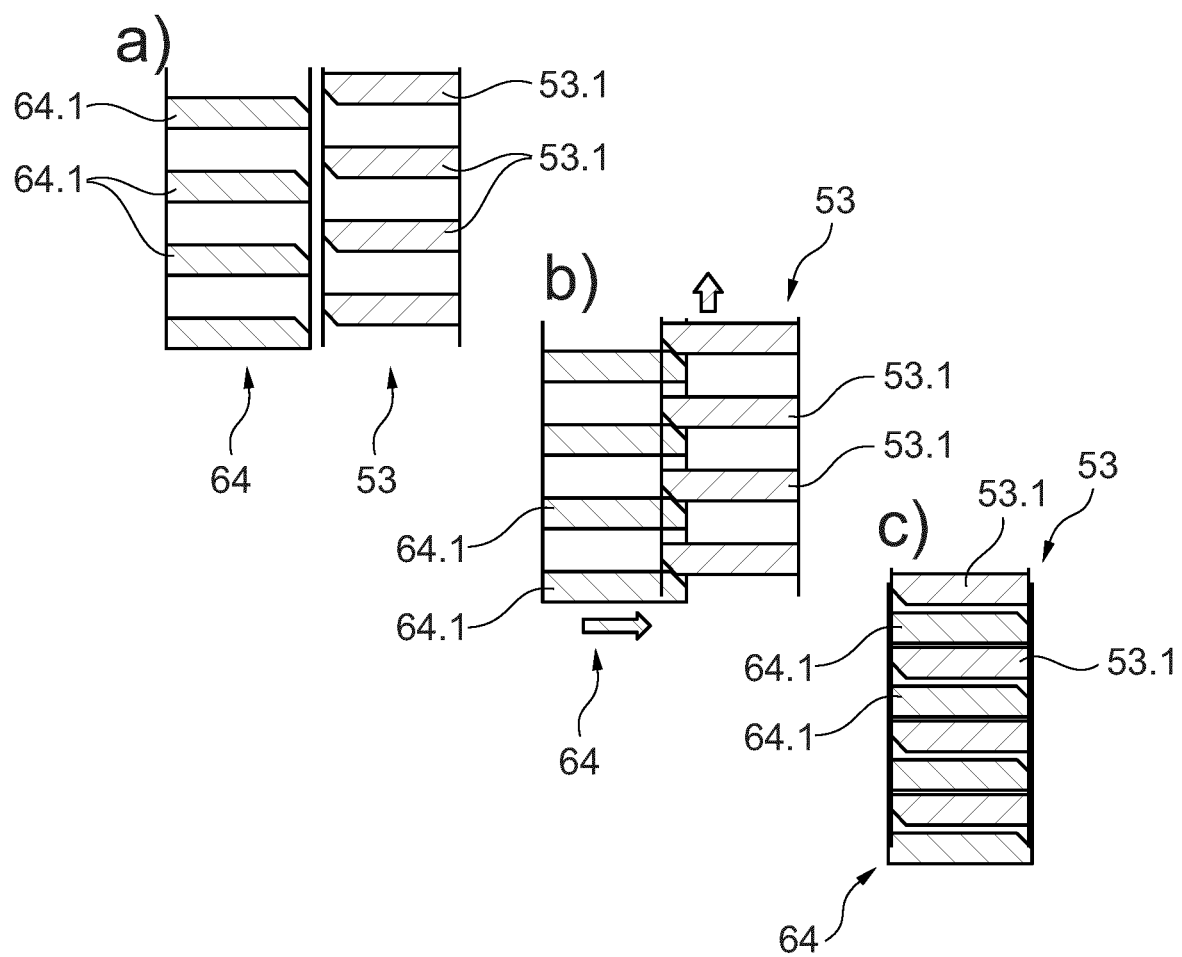
FIG. 5: shows three sketches illustrating the engagement principle of the clutch of FIG. 1.

The shifting process of the clutch arrangement 18 is controlled by the PCU. The engagement of the clutch arrangement 18 will now be explained with reference to FIG. 5. The sketches of FIG. 5 illustrate the respective positions of the coupling sleeve 64 and the coupling ring 53 of the sprag inner race 52. Reference sign 64.1 designates the splines on the inner diameter of coupling sleeve 64, whereas reference sign 53.1 designates the outer splines on the coupling ring 53. FIG. 5 a) to c) correspond to position 0, 1 and 2.

The purpose of the clutch engagement is, e.g., to use the engine mechanical power to drive the wheels at high speed.

Step-1. The clutch is in position 0. The engine is running. The PCU checks whether the input shaft speed 30 (rotating at engine speed) is lower than the output shaft 32 speed (driven by wheel and traction motor). If not, the PCU controls the engine 12 to adjust its speed below that of the output shaft 32. The PCU then commands the shift actuator 66 to move the synchronizer sleeve 64 from "position-0" to "position-1". This movement will also move the synchronizer ring 60 and will bring the sprag outer race 54 speed up to match with the speed of the output shaft 32.

Step-2. The PCU commands the engine 12 or the second EM 16 to catch up the speed of the output shaft 32, but not give any substantial torque to avoid disturbing the torque to the wheels. At the end of this step, the sprag inner race 52 will reach exactly the same speed of sprag outer race.

Step-3. The PCU commands the shift actuator 66 to further move the coupling sleeve member 64 from "position-1" to "position-2". While doing this, the PCU slightly reduces the speed of the input shaft 30 so that there is a backward move of sprag inner race 52 relative to the outer race 54. As shown in FIG. 5 b) and c) the splines of synchronizer sleeve 64 will engage with the splines 52 of the sprag inner race 52. The spline 64.1 and 53.1 have their tips shaped in such a way that it allows the sprag inner race 52 to move backwards when the tips are blocking each other. At the end of this step the clutch closed or fully engaged; this is the "two-way drive" or "Direct Drive" gear.

The PCU also controls the clutch disengagement process, which may comprise the following steps:

Step 1. The PCU sets the engine 12 and first EM 14 to provide slightly positive torque, so that the sprag outer race 54 is not transferring power to the output shaft 32. Then the PCU commands the shift actuator 66 to move the coupling sleeve 64 from "position-2" to "position-1".

Step 2. Next, the PCU sets the input shaft 30 speed to lower speed than output shaft 32 (for example by turning off the engine 12), so that the sprag outer race 54 is spinning freely from the inner race 52. Then the PCU commands the shift actuator 66 to move the coupling sleeve 64 from "position-1" to "position-0". At the end of this step, the clutch 18 is back in the "Neutral" gear; the input shaft 30 is totally disconnected from the output shaft 32.

Turning back to FIG. 1, the design of the second clutch arrangement 40 (associated with second EM 16) will now be described, which also includes a one way clutch. For example, it may be a sprag clutch, where sprag elements 70 are arranged between an inner race 72 and an outer race 74. As can be noticed from FIG. 1, the inner race 72 is here fixed to the rotor 16.2 of the second EM 16. The outer race 74 is attached to a coupling hub 76 disposed on a shaft 78. Coupling hub 76 is integral in rotation with shaft 78, e.g. by way of a splined connection. Fourth gear 42 is also on this shaft and a driving torque can thus be applied thereto by means of the second EM 16, in order to drive the wheels.

Reference sign 80 designates a coupling sleeve that is configured to be axially moveable along the direction of shaft 78 to selectively couple the outer and inner races 72 and 74. Coupling sleeve 80 has spline features on its inner surface. Outer race 74 has spline features on its outer face, whereas the inner race 72 has spline features provided on a coupling ring 82 that has the same outer diameter as outer race 74. Coupling ring is laterally positioned and axially offset, but integral with the inner race 72.

Shifting of the clutch 40 is achieved by means of a second actuator 84 that may comprise an electric motor with an actuating rod equipped with a coupling element that cooperates with a coupling feature on the outer face of coupling sleeve 80 (e.g. a shift fork and groove).

The coupling sleeve 80 here can take two positions, either only on the outer race (position 1) or bridging from the outer race 72 to the inner race 74 (position 2).

In position 1, the coupling sleeve 80 is located only on the outer race 74 and is rotationally coupled therewith due to the spline features. This is the "One-way Drive" position that allows the second EM 16 to drive the wheels, but does not allow the wheels to drive the second EM 16. This mode is useful at very high vehicle speed when EM 16 is reaching its maximum operation speed. In this situation, it is desirable to switch to 'engine drive' by engaging clutch 18 to drive the wheels with 100% by combustion torque. Clutch 40 being in position 1, the second EM 16 will not be towed by the wheels.

In position 2, illustrated on FIG. 1, the coupling sleeve 80 has been axially shifted to come into engagement with the spline features of the coupling ring 82 of the inner race 72. Outer and inner races 72, 74 are thus coupled via the coupling sleeve 80 and rotate at same speed as a single unit. This is the "Two-way Drive" position that allows power flow from the second EM 16 to the wheels and inversely. This mode is advantageously applied to most of the vehicle operations: the second EM 16 can drive wheels and can also recover energy from electric braking.

Another embodiment of hybrid powertrain system 110 will now be described with reference to FIG. 6. Same or similar elements as in FIG. 1 are designated by same reference signs, augmented by 100. The powertrain 110 also includes an internal combustion engine 112 and two rotary electric machines 114, 116. Although first EM 114 is located inside the transmission housing, it is still connected upstream of the clutch 18 in terms of power flow, and therefore this still considered P1/P3 configuration.

The clutch arrangements 118 and 180 are somewhat changed in their internal configuration, but still use a one-way clutch and operate on the same principle as in FIG. 1.

As for the first embodiment, clutch arrangement 118 comprises coaxially mounted input and output shafts 130, 132. The input shaft 130 is integral in rotation with the engine crankshaft 126, via the damper 146 mounted to the flywheel 128. The clutch 118 further includes a one-way clutch 150 having an inner race 152 that is disposed on the input shaft 130 to rotate therewith (e.g. via splined connection), an output race 154 radially spaced from the inner race, and sprag elements 156 in-between.

Clutch arrangement 118 further includes a coupling hub 158, synchronizer ring 160 and coupling sleeve unit 162. Compared to FIG. 1, the coupling hub 158 is here combined with the first gear and thus comprises an additional ring 134 meshing with the second gear 136. The coupling hub 158 is rotationally coupled with the output shaft 132, e.g. by a splined connection on the output shaft 132. The outer diameter of the coupling hub 158 forms an outer face that is provided with spline features.

The coupling sleeve unit 162 here includes a pair of sleeve members 164.1, 164.2 that axially moveable along the clutch axis for the clutch to operate in One-way drive or Two-way drive. Each of the sleeve members 164.1, 164.2 have an internal diameter provided with spline features and matching that of the outer diameter of coupling hub 158, synchronizer ring 160 and outer race 154.

A first clutch actuator 166 is configured to selectively actuate the two sleeve members 164.1 and 164.2 independently from one another. First clutch actuator 166 may comprise a pair of electric motors each with an actuating rod and coupling element that engages a coupling feature on the outer surface of the coupling sleeves 164.1 and 164.2.

Figure 6:
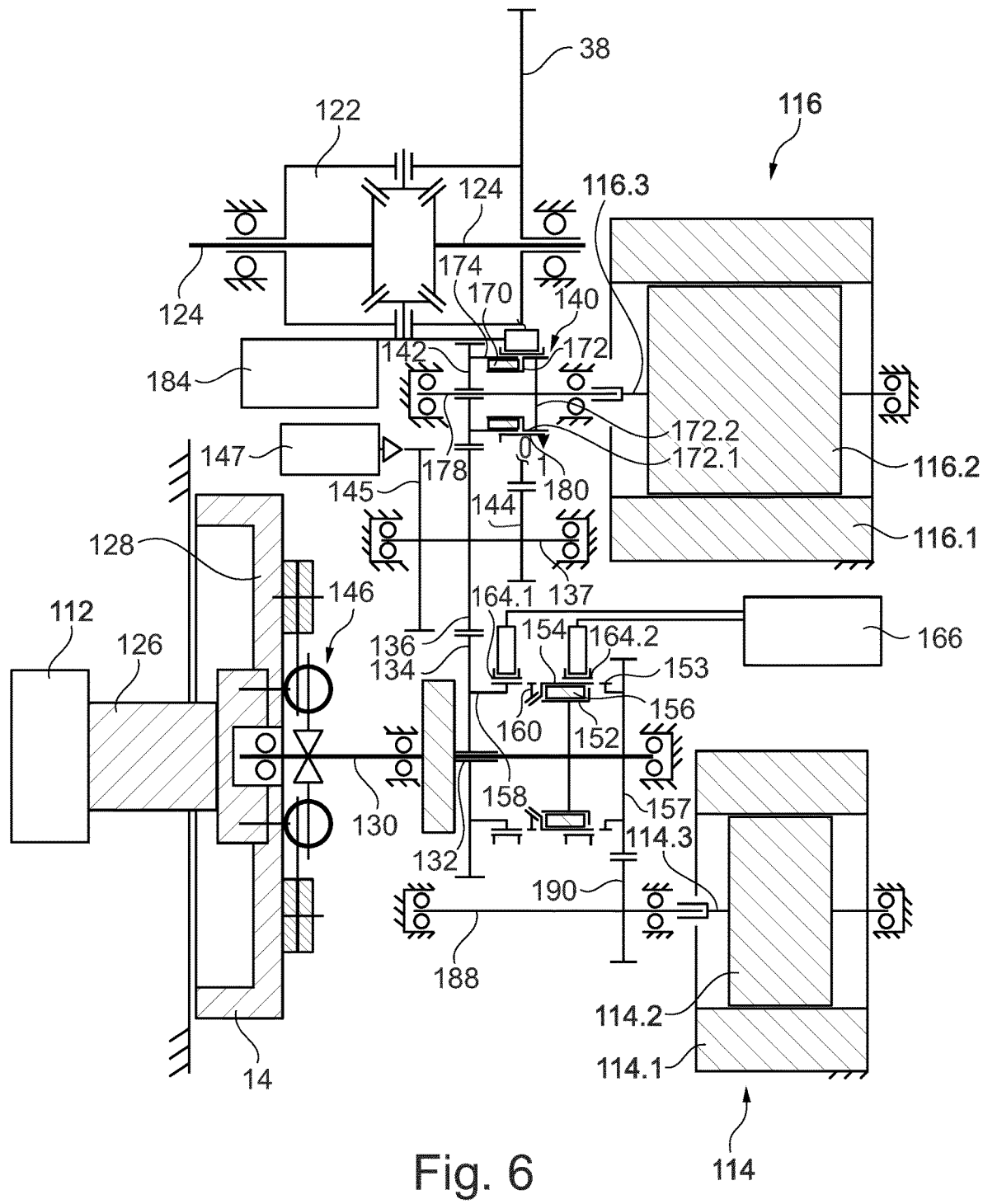
FIG. 6: is a diagram of another embodiment of a hybrid powertrain comprising a second embodiment of the present clutch arrangement.

The configuration shown in FIG. 6 is the neutral position (position 0). Coupling sleeve 164.1 sits only on coupling hub 158 and rotates therewith due to their splined engagement. Coupling sleeve 164.2 sits only on outer race 154 and rotates therewith due to their splined engagement.

Position 1 "one-way drive" is obtained by moving the first coupling sleeve 164.1 to further engage with the synchronizer ring 160 and the outer race 154. In this configuration, the first coupling sleeve 164.1, coupling hub 158, synchronizer ring 160 and outer race 154, as well as second coupling sleeve 164.2, rotate together at the speed of the output shaft 132.

Position 2 "two-way drive" is obtained by axially moving the second coupling sleeve 164.2 so that it engages with both outer race 154 and an auxiliary first gear 157 that is disposed on input shaft 130. Gear 157 includes a coupling ring 153 with an outer diameter corresponding to that of outer race 154 and provided with splined features. Hence, when the second coupling sleeve 164.2 is engaged on outer race 154 and coupling ring 153, and the first coupling sleeve 164.1 is in position 1, the clutch arrangement 118 is in full engagement and the input shaft 130 is in direct coupling with the output shaft 132.

The shifting process is advantageously done in the same way as described with respect to FIG. 1.

Downstream of clutch 118, the transmission comprises the second gear 136 that is disposed on countershaft 137, which further supports auxiliary second gear 144 and a park hub 145, which cooperates with the park lock actuator 147. The auxiliary second gear 144 meshes with third gear 138 coupled with differential 122.

The second EM 116 is coupled to the transmission via the second clutch 140, which includes a one-way clutch with inner and outer races 172, 174, and in-between sprag elements 170. The motor shaft 116.3 of the second EM 116 is directly coupled to shaft 178. The inner race 172 has a radial extension forming an outer splined coupling ring 172.1 with an outer diameter corresponding to that of the outer race 174, which is connected to a hub 172.2 disposed on shaft 178.

The outer race 174 is connected to the fourth gear 142 that is coaxially mounted on shaft 178. That is, contrary to FIG. 1, fourth gear 142 is rotatable with respect to shaft 178.

As for the first embodiment, the second clutch 140 is operable in one-way drive or two-way drive, by axially displacing the coupling sleeve 180 along the axis of shaft 178. Coupling sleeve 180 has an outer diameter matching that of outer race 174 and coupling ring 172.1. Coupling sleeve 180 is provided on its inner face with splined features that can engage splined features on the outer race 174 and coupling ring 172.1.

The position shown in FIG. 6 is "two-way drive". Coupling sleeve 180 sits on both outer race 174 and coupling ring 172.1. In this configuration, rotor 116.2, shaft 178, inner race 172, outer race 174 and fourth gear 172 rotate together at same speed.

In the non-showed "one-way drive" configuration, the coupling sleeve 180 would only sit on outer race 174.

A second actuator 184 is associated with coupling sleeve 180 to selectively move it between the two positions.

Finally, the first EM 114 is in P1 configuration, with its motor shaft 114.3 directly coupled to a shaft 188 on which a fifth gear 190 is disposed. This fifth gear 190 meshes with the auxiliary first gear 157. Accordingly, the first EM 114 is permanently coupled with input shaft 130.

The invention claimed is:

1. A clutch arrangement for a hybrid vehicle powertrain, comprising:
   an input shaft to be connected to a crankshaft of an internal combustion engine;
   an output shaft for connection to a transmission;
   a one-way clutch comprising an inner race connected to rotate with the input shaft and an outer race;
   a coupling hub rotationally coupled with the output shaft;
   a synchronizer ring arranged between the coupling hub and the one-way clutch, the synchronizer ring cooperating with the outer race of the one-way clutch; and
   a coupling sleeve unit that is selectively and axially moveable across the coupling hub,
   wherein the synchronizer ring and the outer race include three positions:
      a neutral position,
      a first position where the coupling sleeve unit couples in rotation the coupling hub, the synchronizer ring, and the outer race, and a second position where the coupling sleeve unit couples in rotation the coupling hub, the synchronizer ring, the outer race, and the inner race.

2. The clutch arrangement according to claim 1, wherein the coupling hub, the synchronizer ring, and the outer race have outer faces with essentially a same diameter,
the inner race has a radially offset coupling ring with an outer face having a same outer diameter as the outer race, and
the outer faces have spline features and the coupling sleeve unit has cooperating inner spline features.

3. The clutch arrangement according to claim 1, wherein the one-way clutch is a sprag-type clutch, and
sprag members are arranged between the inner race and the outer race.

4. The clutch arrangement according to claim 1, wherein the output shaft is cylindrical and coaxially arranged with the input shaft to rotate around the input shaft.

5. The clutch arrangement according to claim 1, wherein the coupling sleeve unit comprises a pair of sleeve members, the pair of sleeve members including:
one sleeve member adapted to operate the coupling sleeve unit corresponding to the first position, and
other sleeve members adapted to operate the coupling sleeve unit corresponding to the second position.

6. The clutch arrangement according to claim 5, further comprising actuating means driven by electric motor(s), and configured to allow selectively moving the coupling sleeve unit axially into the first position or the second position.

7. The clutch arrangement according to claim 2, wherein facing extremities of the spline features on the coupling sleeve unit and the coupling ring are designed to allow backward movement of the coupling ring, in particular the extremities may be rounded or slanted.

8. A hybrid powertrain system comprising:
a first clutch arrangement according to claim 1, disposed between the internal combustion engine and the transmission, wherein the input shaft of the first clutch arrangement is integral in rotation with the crankshaft and the output shaft of the first clutch arrangement is operatively connected with the transmission;
a first rotary electric machine permanently coupled to the crankshaft; and
a second rotary electric machine coupled to the transmission via a second clutch arrangement.

9. The hybrid powertrain system according to claim 8, wherein the first rotary electric machine is directly coupled with the crankshaft, in particular a rotor of the first rotary electric machine is fixed to a flywheel of the crankshaft.

10. The hybrid powertrain system according to claim 8, wherein the first rotary electric machine is driveably coupled to the input shaft.

11. The hybrid powertrain system according to claim 8, wherein the second clutch arrangement is operable in a one-way mode or a two-way mode.

12. The hybrid powertrain system according to claim 11, wherein the second clutch arrangement comprises:
a second one-way clutch including a second inner race rotating with a rotor of the second rotary electric machine and a second outer race interfacing with the transmission; and
a coupling sleeve moveable between a first position and a second position, wherein in the second position, the coupling sleeve couples in rotation the second outer race and the second inner race.

13. The hybrid powertrain system according to claim 12, wherein
the second inner race comprises a radially offset coupling ring having essentially same outer diameter as the second outer race,
the second outer race and coupling ring have spline features on their outer face, and
the coupling sleeve has an inner passage having a diameter substantially matching that of the second outer race and the coupling ring, and provided with spline features.

14. The hybrid powertrain system according to claim 8, wherein
the inner race is rotationally integral with a rotor of the second rotary electric machine, in particular, the inner race is fixed to the rotor, or
the inner race is mounted on a shaft directly coupled to a motor shaft of the second rotary electric machine.

15. The hybrid powertrain system according to claim 8, further comprising:
a central processing unit configured to operate a shifting process of the first clutch arrangement according to the following steps:
the first clutch being in an initial position with the internal combustion engine running, checking that the input shaft is rotating at lower speed than the output shaft, and then commanding an actuator to move a synchronizer sleeve to the first position, thereby also moving the synchronizer ring and bringing the outer race to speed up to match with the speed of the output shaft;
commanding the engine or the second rotary electric machine to catch up the speed of the output shaft, whereby the inner race will reach the speed of the outer race; and
commanding actuating means to further move the coupling sleeve unit into the second position, and in doing so reducing the speed of the input shaft so that there is a backward move of the inner race relative to the outer race, whereby splines of the synchronizer sleeve will engage with the splines of the inner race coupling ring.

\* \* \* \* \*

UNITED STATES PATENT AND TRADEMARK OFFICE
CERTIFICATE OF CORRECTION

| | |
|---|---|
| PATENT NO. | : 12,097,842 B2 |
| APPLICATION NO. | : 17/766626 |
| DATED | : September 24, 2024 |
| INVENTOR(S) | : Xiangdong Xu et al. |

It is certified that error appears in the above-identified patent and that said Letters Patent is hereby corrected as shown below:

In the Claims

Column 12, Line 35, in Claim 15, delete "following steps:" and insert --following:--.

Signed and Sealed this
Twelfth Day of November, 2024

Katherine Kelly Vidal
*Director of the United States Patent and Trademark Office*